Nov. 19, 1935.  J. TYLER  2,021,530
VENTILATED TRAY
Original Filed Feb. 1, 1932  2 Sheets-Sheet 1
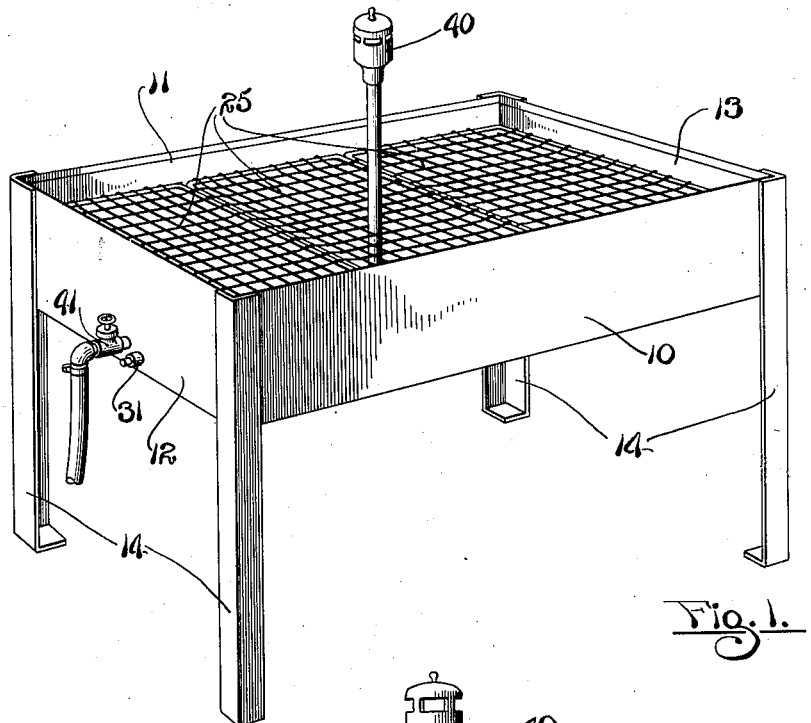
Fig. 1.
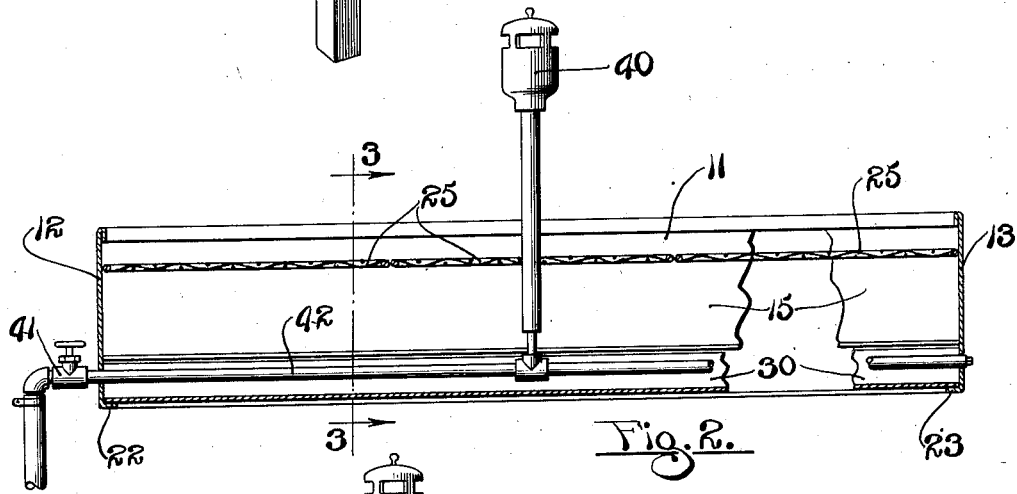
Fig. 2.
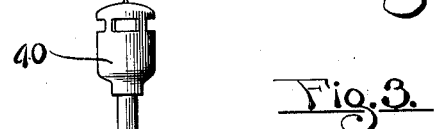
Fig. 3.
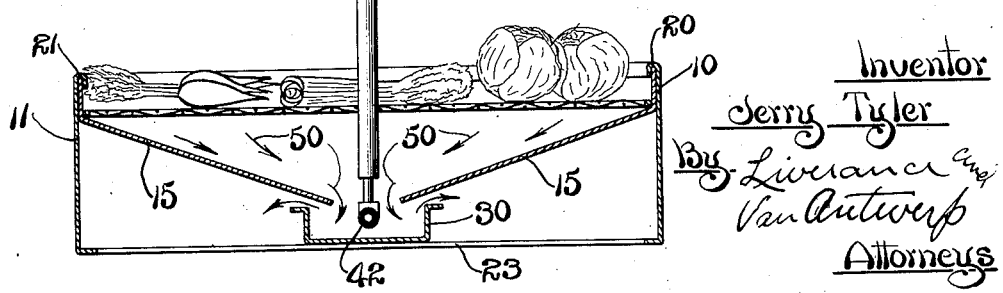
Inventor
Jerry Tyler
By Livrance and
Van Antwerp
Attorneys Nov. 19, 1935.    J. TYLER    2,021,530
VENTILATED TRAY
Original Filed Feb. 1, 1932    2 Sheets-Sheet 2
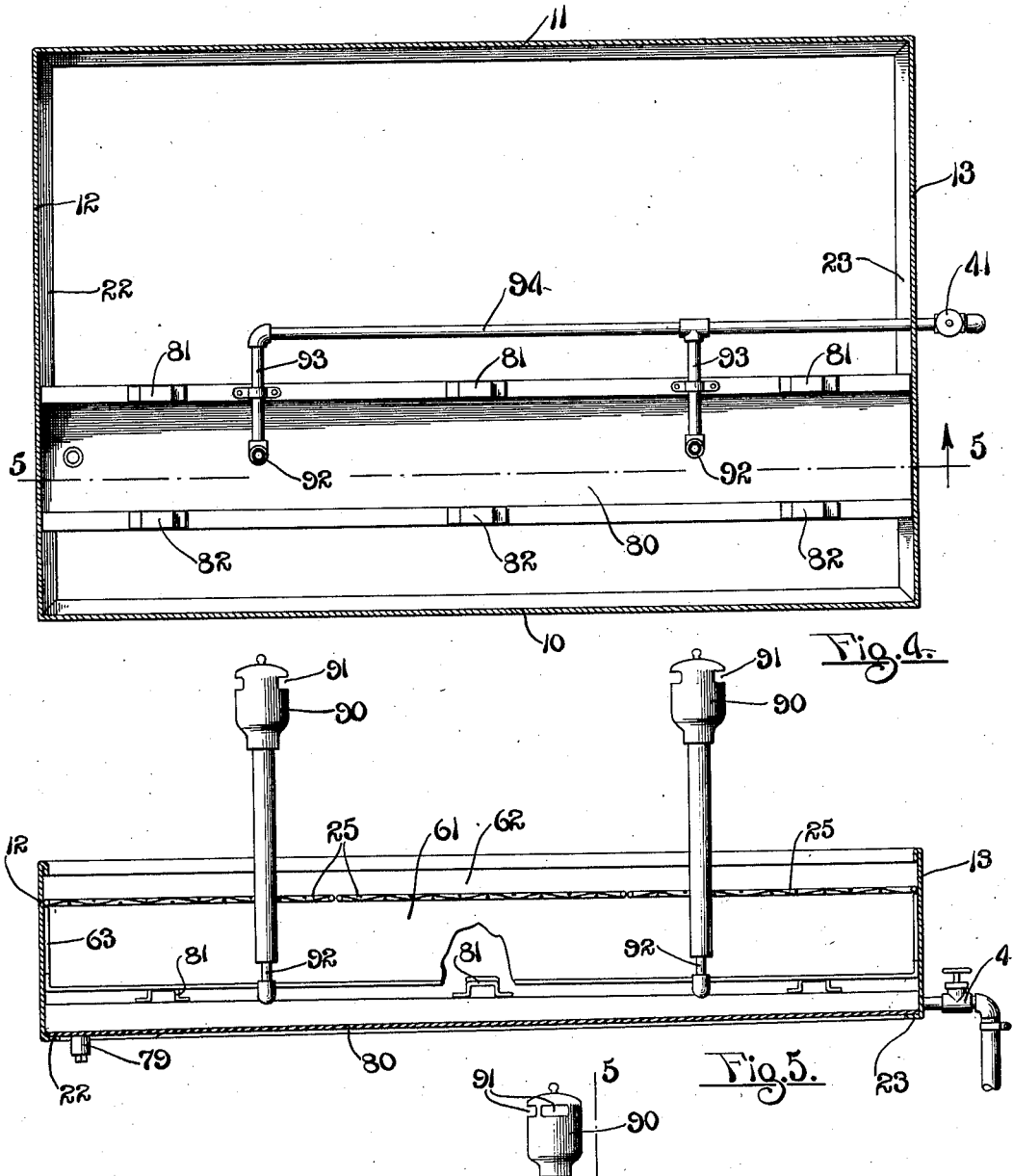
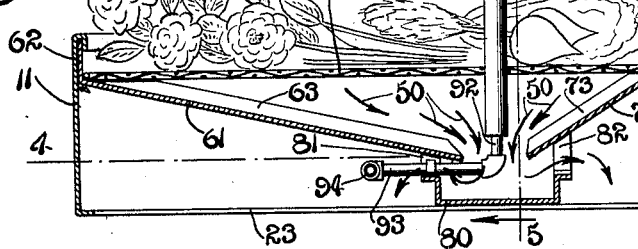

Patented Nov. 19, 1935

2,021,530

UNITED STATES PATENT OFFICE 2,021,530

VENTILATED TRAY

Jerry Tyler, Niles, Mich.

Application February 1, 1932, Serial No. 590,078
Renewed May 14, 1934

5 Claims. (Cl. 211—127)

This invention relates generally to a tray or support and more definitely to a tray having a perforated surface for supporting vegetables, fruit, flowers and the like whereby the air may freely circulate entirely around the same and thus preserve them in a fresh and sweet condition.

As set forth in my application filed February 16, 1931, Serial No. 515,938, I utilize a spray nozzle over the perforated support or shelf whereby a fine spray is diffused over the produce to be preserved and this spray falls upon and floats around the produce and thus keeps the same sweet and clean and fresh. The mist also takes up any vapors which emanate from the produce and these odors are carried downwardly due to the fact that the air is cooled by the mist floating therein and thus becomes more dense. It is this feature of disposing of this air which forms the gist of the present invention.

In my improved device the air is carried downwardly through the tray and disseminated underneath the tray. Such a feature has two advantages. In the first place the vegetables will maintain their quality for a longer period of time because the destroying odors and air are continuously drawn away from the vegetables and such is replaced by sweet and clean and humidified air from above the tray. In the second place the obnoxious departing fumes or odors are drawn downwardly through the tray and leave the tray in proximity to the floor thus preventing any objection to the tray on account of one being able to smell any odors from above the vegetables.

In the drawings:—

Fig. 1 is a perspective view of a tray of table form built in accordance with my invention.

Fig. 2 is a longitudinal cross sectional view of Fig. 1.

Fig. 3 is a view taken along the plane of the line 3—3 of Fig. 2.

Fig. 4 is a view taken along the line 4—4 of Fig. 6, this view being in cross sectional plan and illustrating the preferred form of my invention.

Fig. 5 is a vertical cross sectional view, this view being taken along the line 5—5 of either Fig. 4 or Fig. 6.

Fig. 6 is a typical cross sectional view through the tray as shown in Figs. 4 and 5.

Similar numerals refer to similar parts throughout the several views.

The cooling tray consists of side members 10 and 11, and end members 12 and 13 and legs 14 are fastened to and support the end and side members so as to form a table structure as clearly shown in Fig. 1.

Baffle plates or drain boards 15, see Fig. 3, extend lengthwise of the table and slope downwardly as shown. The upper portions of the baffle plates are turned upwardly at an abrupt angle and lie adjacent the top portion of the sides 10 and 11, these sides being turned over the upper edge of the baffle plates as indicated at 20 and 21. Thus the baffle plates are held in position. Also, the ends of the baffle plates may be fastened to the end members 12 and 13 as by welding.

A series of perforated members, such as wire screens or shelves 25, rest upon the baffle plates as clearly shown in Fig. 3 and extend across the table to form a support for the produce as will be readily understood.

It will be noted that the baffle plates terminate some little distance from each other whereby air may flow downwardly therebetween.

A trough 30, having a drain 31, extends lengthwise of and is supported by inturned flanges 22 and 23 on the end members 12 and 13, respectively, see Fig. 2, and this trough catches the water which first issues from the spray nozzle 40, this nozzle being supplied with water through the valve 41, pipe 42, then the water flows downwardly under and around the produce and finally drains downwardly over the baffle plates 15 into the trough 30 from which the drain 31 leads.

The spray is thrown outwardly and downwardly from the nozzle and forms a cone-shaped space which might be called a vapor area as it is directly saturated with water vapor from the nozzle. Adjacent this space the air is approximately saturated with cool moisture and thus a humid area is formed.

The arrows 50 indicate the flow of air which is caused by the flowing of the water and mist as just set forth. The water issuing from the nozzle 40 cools the air and thus the air and water vapor, such becoming laden with the scent of the produce, tends to flow downwardly due to the fact that it is cooler and hence heavier than the surrounding air. Thus it gravitates downwardly as indicated by the arrows 50 and is thus taken from the proximity of the produce and this not only keeps the produce in better condition due to the fact that the odors themselves tend to accelerate decay of other produce but the produce does not cause the air above the table to become heavily aromatized by the variety of smells and fragrances arising from the mixture of produce which may be kept upon the table. Thus the customer is not assailed by a diversity of smells as the air is kept in a comparatively pure condition immediately above the table.

Referring now to the preferred form of my invention as shown in Figs. 4, 5 and 6, numeral 61 indicates a baffle member having a vertical portion 62 extending under the inturned top flange on the side 11 and having flange portions 63 welded to the ends 12 and 13.

A similar baffle portion 71 has a vertical portion 72, extending under the side 10, and a flange 73, this flange being welded to the end members. The lower edges of the baffle plates are spaced apart and terminate in the same horizontal plane.

A trough member 80, resting at its ends upon the flanges 22 and 23, and which is immediately supported by the bracket members 81 and 82, these bracket members extending from the baffle plates 61 and 71, respectively, are held below the baffle plates so that a current of air may pass downwardly and over the upper side of the trough member 80 as clearly indicated by the arrows 50.

A nozzle member 90, having a series of irregularly spaced openings 91 therein, whereby proper diffusion of the water vapor will be had, is furnished with water through the vertical riser 92, horizontal pipe 93 and supply pipe 94. The trough 80 is located a sufficient distance below the baffle plates so that the pipe 93 may extend horizontally and thus the drain back to the trough 80, the same occurring around the pipe 92, as set forth in my previous application, will drip from the pipe 92 into the trough.

The trough 80 is provided with a drain plug 79.

It will be noted that the preferred form of my invention is shown in Figs. 4, 5 and 6 is not supported by leg members 14 such as are shown in Fig. 1, as in many instances other means are used to support the tray. This is especially true when the device is mounted in a store window and it is only necessary that a sufficient space be had for carrying away the foul odors which are thrown off below the tray.

Having thus described my invention I desire it to be understood that the invention is in no wise limited to the particular illustrative embodiment disclosed, the scope thereof being set forth in the following claims.

I claim:

1. A vegetable cooling tray comprising a supporting structure including vertical side members fastened together at or near their ends to form a rectangular frame and legs extending downwardly therefrom, two of the opposed side members having their tops curved over inwardly toward each other to form downwardly facing U-grooves, baffle plates, each having an upturned edge extending into its particular groove, said baffle plates inclining downwardly towards the center of the frame, said baffle plates terminating a short distance from each other, a trough member extending lengthwise of said frame below the terminating edges of the baffle plates and spaced a considerable distance therebelow whereby air may circulate between said trough member and the baffle plates, and wire shelves supported upon the baffle plates along the line of their juncture with the side members.

2. A vegetable cooling tray as set forth in claim 1 but further characterized by the fact that the baffle plates are of similar construction whereby ease of manufacture is had and whereby the trough may be medially located relatively to the frame of the table.

3. A vegetable cooling tray comprising a supporting structure including vertical side members fastened together at or near their ends to form a rectangular frame, two of the opposed side members having their tops curved over inwardly toward each other to form downwardly facing U-grooves, baffle plates, each having an upturned edge extending into its particular groove, means at each end of each baffle plate for fastening it to the adjacent side member, said baffle plates inclining downwardly towards the center of the frame, said baffle plates terminating a short distance from each other, a trough member extending lengthwise of said frame below the terminating edges of the baffle plates and spaced a considerable distance therebelow whereby air may circulate between said trough member and the baffle plates, and wire shelves supported upon the baffle plates along the line of their juncture with the side members.

4. A vegetable cooling tray comprising, a supporting structure including vertical side members fastened together substantially at their ends to form a rectangular frame, a pair of baffle plates, each baffle plate and one of a pair of opposed side members being connected together by means of a return bent portion on one of said elements whereby a U-groove is formed to receive a portion of the other element, said baffle plates inclining downwardly towards the center of the frame, said baffle plates terminating a short distance from each other, a trough member extending lengthwise of said frame below the terminating edges of the baffle plates and spaced a considerable distance therebelow whereby air may circulate between said trough member and the baffle plates, and wire shelves supported upon the baffle plates.

5. A vegetable cooling tray comprising, a supporting structure including side members fastened together substantially at their ends to form a frame, a pair of baffle plates, each baffle plate and one of a pair of opposed side members being connected together by means of a return bent portion on one of said elements whereby a groove is formed to receive a portion of the other element, said baffle plates inclining downwardly from the respective sides of the frame to which they are attached, said baffle plates terminating short of one another, a trough member secured to and extending lengthwise of said frame below the terminating edges of the baffle plates and spaced an appreciable distance therebelow whereby air may circulate between said trough member and the baffle plates, and a foraminated shelf supported on and over the baffle plates.

JERRY TYLER.